Patented May 12, 1942

2,282,808

UNITED STATES PATENT OFFICE 2,282,808

STABILIZATION OF ESSENTIAL OILS

Sidney Musher, New York, N. Y., assignor to Musher Foundation Incorporated, New York, N. Y., a corporation of New York No Drawing. Original application September 23, 1938, Serial No. 231,344. Divided and this application November 22, 1941, Serial No. 420,132

7 Claims. (Cl. 260—236.6)

The present invention relates to the stabilization of essential oils and products containing the same, by treating them with the concentrated water soluble extract of cereals and grains, and particularly when the stabilizing activity of that extract is increased in potency by heat treatment.

It is among the objects of the present invention to provide improved stabilized essential oils, or compositions containing the same subject to oxidative deterioration.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found most satisfactory to incorporate in products subject to deterioration the water soluble extract in concentrated form of the cereals and grains such as corn, barley, oats, hominy, tapioca, rye, rice, wheat, buckwheat, etc. The preferred material for extraction contains less than 0.75% total phospholipins and less than 10% of glyceride content and it is preferably in a fine state of division. The cereal extract derived from oats and maize preferably in raw unbleached condition, dry milled and in flour or divided form gives the highest yield of stabilizing activity and is far more desirable. The cereals produce the most acceptable extract because of their low oil content which seems to enhance the production of a substantially oil-free extract as contrasted to the high oil containing materials in which the antioxidants are not as readily susceptible to water extraction.

Although the water soluble extract may be prepared in many different fashions and may be added at many stages to products subject to deterioration, it has been found most satisfactory to prepare such extract by grinding or dividing the cereal and then submerging it in or extracting it with water or an aqueous material which is to be used in the product or processing of the organic material to be stabilized.

As a general rule, the cereal undissolved portion may be removed by filtration, or the liquid may be removed by decanting, centrifuging or similar process, and the time of extraction may vary from a few seconds to a period of several hours or longer. The aqueous solvent may be employed either at room temperature or higher.

To 1 pound of cereal, there may be used, for example, 1 gallon of water or more, dependent upon the degree of concentration desired. Following a thorough mixture, the water may be removed without substantially decreasing the activity of the extract by vacuum distillation, by drying, at room temperature, or in a reducing atmosphere, etc., and the extract will take the form of a brown pasty material or a dry powdery grayish material, generally hygroscopic in character.

The extracts may not be completely soluble in the essential oil to be stabilized, but this will not decrease their efficiency as stabilizers. Where desired, the insoluble material may be filtered off preferably following heating in the oil being stabilized to a temperature in excess of 250° F. and desirably in excess of 350° F.

This extract, in contradistinction to the crude vegetable oils, lecithin, etc., is not only unaffected by heat treatment, but is actually activated under conditions of heat. When the extract is utilized in organic products containing essential oils that are normally processed at high temperatures, or to which a high temperature treatment may normally be applied, minute percentages of the extract will give a marked stabilizing action.

The essential oils or products containing the same may be treated with the concentrated water soluble extract of the cereals to markedly improve their stability, and the stabilizing effect is particularly observed when the extract is heated in the oil to temperatures in excess of 250° F. and desirably in excess of 350° F.

Although the concentrated water soluble extract is preferred for use with the organic materials containing essential oils described herein, where advisable, the unconcentrated water soluble extract of the cereals may also be employed.

Essential oils particularly are subject to rapid deterioration when in emulsified form and the use of the water soluble extract in the disperse water phase will materially retard such deterioration.

The concentrated extract obtained contains a certain amount of carbohydrate material as a result of which charring is produced when the extract is heated in the presence of the oxidizable material. Regardless of the charring, however, the extract, as indicated in the examples, becomes increasingly effective at temperatures in excess of about 250° F. and particularly at 400° F. or above so that it may readily be used in connection with materials that are normally processed at high temperatures and where other antioxidants, and particularly the oil soluble antioxidants would be inactivated or at least substantially reduced in activity.

Moreover, the extracts described, whether evaporated to dryness or not, are frequently more effective than the unextracted cereals from which they were removed, and after being in contact with the oxidizable materials for long periods, the treated materials retain their improved status for a longer period than if the original cereal were used.

Another distinct advantage in this treatment is that the presence of bulky fibrous or starchy materials is avoided when the extract is employed.

The extracts of the present invention, therefore, differ remarkably from other oil soluble antioxidant materials, such as, for example, lecithin, crude vegetable oils, etc., in that they contain a quantity of carbohydrate material, they are not deactivated at elevated temperatures, but even become more active at temperatures as high as 400° F., for example, and they have more continued potency for longer periods of time.

It has also been observed that the relative rate of activation under conditions of heat treatment is far greater when the extract is utilized than when the proportionate amount of the unextracted cereal is utilized.

For example, when flour is activated under conditions of heat in an oxidizable oil, its potency will be increased to only a small portion of the increase observed when the extract of that cereal used in proportionate amounts is similarly heated.

The extracts described may be applied, particularly when heat activated, to the essential oils themselves and also to the pharmaceutical or food preparations, creams, and other products containing the same.

Although the unconcentrated extract may be utilized, it is preferable for purposes of this invention to use the concentrated or dry extracts after removal of the aqueous solvent. Where water is normally used in the processing of organic materials, there may be employed either the concentrated extract or the unconcentrated extract in a dilute form.

There may also be employed, less desirably than the cereals, the substantially oil free seeds for purposes of extraction. For example, those oily seeds which contain in excess of 45% of oil and wherein free oil is released during any macerating or grinding process may not be readily extracted with an oil insoluble solvent such as water. Following expression or extraction of a substantial portion of the oil, the residue may be extracted and the extract so obtained may be employed as an antioxidant in the essential oils, and products containing the same, and particularly activated under conditions of heat.

The cereals and to a greater degree the de-oiled or low oil containing seeds even without extraction of the water and/or alcohol soluble portion exhibit much more marked antioxidant activity after being subjected to temperatures in excess of 250° F. and more desirably in excess of 400° F. and particularly in the presence of the oxidizable material.

However, in accordance with the present invention it is preferred to use the water extract of such materials.

Among other less preferred materials are the substantially dry seeds capable of powdering without releasing free oil during a macerating process. For example, such seeds as cottonseed or soya may be employed particularly after the expression or extraction of the glyceride oils contained therein. Care must be exercised to remove all possible water insoluble materials when preparing, for example, the water soluble extract. Any milky suspension obtained during careless or incomplete water extraction will contain water insoluble materials including glyceride oils. It is desirable to have the extract substantially free of water insoluble materials such as would be present in a milky suspension and which water insoluble materials would prove detrimental to the preparation of the extract.

The extracts of the seeds differ from the extracts of the cereals in that the seed extracts are considerably higher in carbohydrate content, will char and will discolor oils particularly under conditions of heat more readily than the extracts of the cereals.

In addition to using water as the extracting medium, alcohols may be also employed, although they are less desirable. Among the alcohols that may be used are ethyl and less preferably methyl, butyl, propyl, and accepted denatured types of alcohols. In certain cases it is also possible to use polyhydric alcohols such as glycerol or other glycols, but as a general rule these polyhydric alcohols are not particularly satisfactory. The alcoholic extracts may desirably be subjected to an oil solvent extraction so as to remove such of the glycerides as happen to be present. This will not materially alter the effectiveness of the extract and particularly where the maximum water solubility is required, will be of distinct advantage. Mixtures of the alcohols and water, of course, may be employed. Oil extracting solvents such as hexane should not be employed. The alcohol and water types of solvent are included by the expression XOH where X represents hydrogen, or a low molecular weight aliphatic group.

Although the cereals are always preferred in divided form and although in certain cases the oil bearing seeds and nuts, the oil content of which has been reduced to below 10%, may be utilized for extraction, it is possible in some cases to combine with these materials or to use alone other beans such as the cacao bean, from which a large proportion of the oily and fatty materials have been extracted or expressed, or the coffee bean in unroasted condition, both of which materials should preferably be in powdered form before extraction. Other similar materials containing water extractable carbohydrates, and, to a lesser degree, phospholipins in combination with such carbohydrates may also be employed.

The heat treatment for purposes of activation referred to herein should, as indicated, be desirably carried out in the presence of the oxidizable substance and should be carried out at a temperature in excess of 250° F. The higher the temperature up to about 450° F., the greater will be the increase in antioxidant activity and the proportionate increase will be far greater at temperature ranges in excess of 350° F. For example, when the heat treatment is carried out at 400° F. to 450° F., a much greater increase in antioxidant effect will be produced than where the heat treatment is only 250° F. to 300° F. For this reason it is desirable wherever practicable to subject the oxidizable material to a heat treatment of about 400° F. to 450° F. with a small amount of the stabilizing material described herein.

By the term "essential oils" is meant the flavoring oils such as oil of lemon, oil of orange, oil of peppermint, oil of wintergreen, oil of cloves, oil of sassafras, and the other essential oils and also the various perfume oils.

There are also included food compositions which may include or contain in a small proportion these essential oils as well as the pharmaceutical creams including cold cream, vanishing cream, shaving cream, etc., and all of which are subject to oxidation and contain varying proportions of these essential oils.

The antioxygenic extracts referred to herein may be added to the essential oils themselves in amounts ranging from 0.1% to 5% or more and to the products containing the essential oils in amounts ranging from 0.02% to 2.5%.

Moreover, the essential oils, particularly in their substantially pure condition, may be homogenized and dispersed in the disperse phase of an emulsion where the continuous aqueous phase comprises the water and alcohol soluble extracts referred to in accordance with the present invention. For example, oil of orange or oil of lemon may be homogenized in the concentrated water extract of corn flour and the emulsion thus obtained may be utilized either as such or for addition to food compositions, whereby such food composition will be stabilized against oxidative deterioration.

Under these conditions where the essential oil is homogenized in the cereal extract, the essential oil may comprise only from 3% to 15% by weight against the weight of the cereal extract.

Following or during homogenization of the essential oil in the extract prepared in accordance with the present invention, the emulsion formed with the essential oil or composition containing the same is subjected to the elevated temperature of 250° F. or more in order to obtain the highly active and enhanced antioxygenic effect.

The present application is a division of application Serial No. 231,344 filed September 23, 1938, which has matured into patent 2,273,062, issued Feb. 17, 1942.

Having described my invention, what I claim is:

1. A composition containing a substantially unoxidized essential oil, said essential oil being subject to oxidative deterioration upon standing or heating in the presence of air and said composition containing sufficent substantially unoxidized oil to produce deterioration of the composition upon oxidative deterioration of said oil, said composition containing the reaction product of a relatively small amount of an oil insoluble, carbohydrate containing fiber free and starch free antioxidant material extracted by a solvent selected from the group consisting of water and alcohol from a finely divided raw unbleached low oil and low lecithin containing cereal flour, said antioxidant material having been dispersed throughout the body of the composition, said reaction product having been formed by heating said antioxidant material with the oil at a temperature of at least about 250° F.

2. A composition containing a substantially unoxidized oil of orange, said oil of orange being subject to oxidative deterioration upon standing or heating in the presence of air and said composition containing sufficient substantially unoxidized oil of orange to produce deterioration of the composition upon oxidative deterioration of said oil, the composition containing the reaction product of a relatively small amount of an oil insoluble, carbohydrate containing fiber free and starch free antioxidant material extracted from the cereals by a solvent selected from the group consisting of water and alcohol dispersed throughout the body of the composition, said reaction product having been formed by heating said antioxidant material with the oil at a temperature of at least about 250° F.

3. A substantially unoxidized oil of lemon normally subject to oxidative deterioration and development of rancidity upon standing or heating in the presence of air, said oil containing the reaction product of 0.2% of the concentrated fiber and starch free carbohydrate water soluble extract of dry milled maize flour, said extract being dispersed throughout the body of the oil, said reaction product having been formed by heating said antioxidant material with the oil at a temperature of at least about 250° F., whereby said oil has been rendered highly resistant to oxidative deterioration.

4. A substantially unoxidized essential oil emulsion normally subject to oxidative deterioration upon standing or heating in the presence of air, said emulsion containing the reaction product of about 2% of concentrated fiber and starch free carbohydrate containing water extract of oat flour, said extract being distributed throughout the body of the emulsion, said reaction product having been formed by heating said antioxidant material with the oil at a temperature of at least about 250° F., whereby said emulsion has been rendered highly resistant to oxidative deterioration.

5. The process of stabilizing compositions containing substantially unoxidized essential oils, said oils being subject to oxidative deterioraton and being present in sufficient quantity in the composition to produce deterioration of the entire composition upon oxidative deterioration of the oil therein, said process consisting of dispersing a small quantity of an oil insoluble, carbohydrate containing fiber free and starch free antioxidant material extracted by a solvent selected from the group consisting of water and alcohol from finely divided raw unbleached seeds in said compositions so as to assure thorough mixture with and contact between the antioxidant material and the composition and then heating to a temperature in excess of 250° F., whereby said composition and said oil contained therein are both rendered highly resistant to oxidative deterioration.

6. The process of stabilizing essential oils which comprises homogenizing said essential oils in a carbohydrate containing, fiber free and starch free extract of a cereal, said extract extracted by a solvent selected from the group consisting of water and alcohol from a finely divided, ray, unbleached, low oil and low lecithin containing cereal, said emulsion being subjected to an elevated temperature, at least about 250° F.

7. A substantially unoxidized essential oil emulsion normally subject to oxidative deterioration upon standing in the presence of air, said emulsion containing the reaction product of a concentrated, fiber and starch free carbohydrate containing extract of a cereal, said essential oil being distributed as the disperse phase in the body of an emulsion comprising the extract as the continuous phase, said reaction product having been formed by heating said essential oil in the emulsion with the extract at a temperature of at least about 250° F. whereby said emulsion has been rendered highly resistant to oxidative deterioration.

SIDNEY MUSHER.